Aug. 31, 1937.  H. E. BRELSFORD  2,091,303
INDICATING AND CONTROL MECHANISM
Filed March 9, 1931   2 Sheets-Sheet 2

INVENTOR
Harry E. Brelsford
BY Whittemore Hulbert
Whittemore & Belknap
ATTORNEYS Patented Aug. 31, 1937

2,091,303

UNITED STATES PATENT OFFICE 2,091,303

INDICATING AND CONTROL MECHANISM

Harry E. Brelsford, Detroit, Mich., assignor to Diamond Power Specialty Corporation, Detroit, Mich., a corporation of Michigan Application March 9, 1931, Serial No. 521,268

8 Claims. (Cl. 73—290)

This invention relates to an indicating and control mechanism and has particular reference to a mechanism of this character for indicating and controlling the level of a liquid or the like.

One of the primary objects of this invention is to provide a mechanism of the above mentioned character which will be extremely sensitive to variations in the level of the liquid being controlled.

The invention further contemplates the provision of a mechanism of the above mentioned character which will include an element sensitive to light and which will include means for interposing between this element and a source of light, a shield, the position of which will depend upon the level of the liquid being controlled.

The invention contemplates further the provision of a mechanism which will automatically control the supply of the liquid and the provision of a mechanism which will include means for sounding alarms when the level of the liquid reaches predetermined high or low levels.

Other objects and advantages of the invention will become more apparent as the following description proceeds, particularly when reference is had to the accompanying drawings, wherein.

For the purpose of disclosing the invention, the same will be described and illustrated as embodied in a mechanism for indicating and controlling the level of water in a boiler drum, but it is to be understood that the embodiment illustrated and described is for the purpose of illustration only and that the invention will find equal utility in a mechanism for indicating and controlling the level of any liquid and in any type of container or the like.

Figure 1:
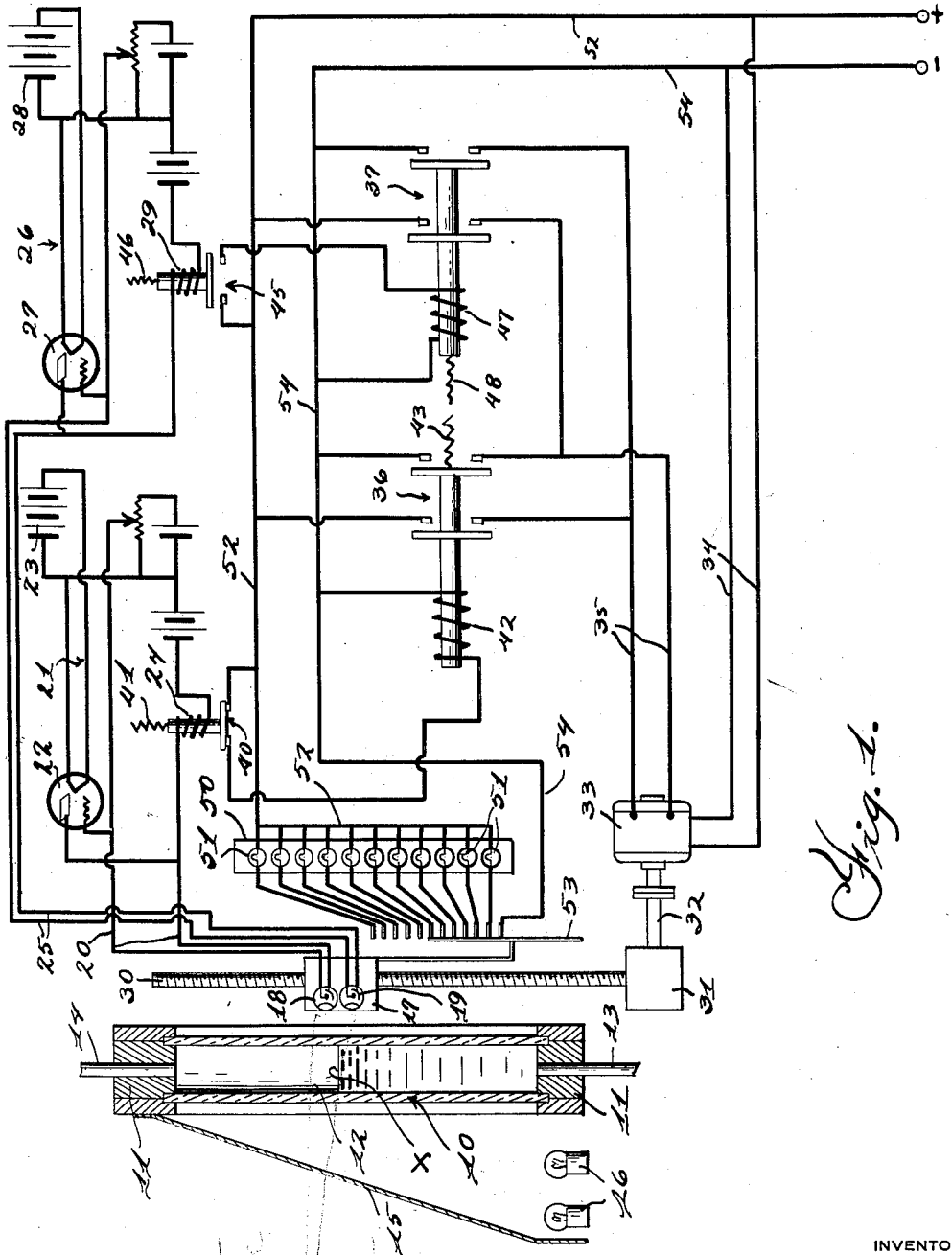
Figure 1 is a semi-diagrammatic view showing a mechanism constructed in accordance with the teachings of this invention.

Referring then particularly to the drawings wherein like reference characters designate corresponding parts throughout all views, there is shown in Figure 1 a gauge glass 10 mounted at its ends in the fittings 11, the gauge glass providing a chamber 12 to which water and steam pipes 13 and 14 are connected. It is to be understood that the pipes 13 and 14 will be connected to the water and steam spaces respectively of a steam drum so that the level of the water in the chamber 12 will correspond to the level of the water in the boiler drum.

Associated with one side of the gauge glass and mounted in an inclined position with respect thereto is a reflector 15 and mounted below this reflector are a plurality of lamps or the like 16. These lamps provide a source of light which is reflected by the reflector 15 through the gauge glass 10.

Mounted for vertical movement adjacent the gauge glass and on the opposite side thereof from the shield 15, is a block 17 which carries the photo-electric cells 18 and 19. It will be understood that these photo-electric cells are sensitive to light in that they will act as electrical relays and will conduct an electric current when they are properly energized by the proper amount of illumination which may pass into the bulbs through small windows in the sides thereof. The present invention contemplates the provision of means responsive to the level of the water in the boiler drum for moving these photo-electric cells vertically so that one of the photo-electric cells will always be above the level of the water, while the other photo-electric cell is always below the level of the water.

Connected to the photo-electric cell 18 are the leads 20 which in turn are electrically connected to an amplifying circuit designated generally by the reference character 21. This amplifying circuit may be of usual construction and includes the amplifying bulb 22 and the batteries 23. Also connected in the circuit 21 is a coil 24 which constitutes a portion of a relay, as will hereinafter be more fully described.

Electrically connected to the photo-electric cell 19 are electric conductors 25 which in turn are connected to a second amplifying circuit 26. This amplifying circuit is similar to the circuit 21 and includes an amplifying bulb 27, the batteries 28, and a coil 29, which coil forms a portion of a relay about to be described.

For moving the block 17 vertically, this block is threadedly mounted on a vertically arranged threaded shaft 30. At its lower end this threaded shaft is journaled in a casing 31 in which are mounted suitable gears (not shown) for effecting a rotation of this shaft. A drive shaft 32 enters the casing 31 to drive the gears therein and this drive shaft is driven by a reversing motor 33.

The reversing motor 33 is preferably a direct current motor and leads 34 connected to a suitable source of electrical energy are connected to the field of this motor. Additional leads 35 are connected to the armature of the motor 33 and the flow of electrical current through these leads is controlled by switches 36 and 37 which in turn are controlled by the relays of which the coils 24 and 29 form parts.

Thus there is associated with the coil 24 a switch 40 which is normally held in open position by a spring 41 but which is adapted to be closed by the coil 24 when the latter is energized. This switch controls the flow of electrical current to an operating coil 42 which when energized holds the contacts 36 in open position against the tension of springs 43. The operating coil 29 is arranged to close a switch 45 against the tension of a spring 46 and this switch controls the flow of electrical current to an operating coil 47 which when energized closes the contacts 37 against the tension of springs 48. The operation of the structure as thus far described is as follows. Light will be reflected by the reflector 15 toward the photo-electric cells 18 and 19, but if the level of the water is at the point indicated by the reference character X, the photo-electric cell 18 will be illuminated while the photo-electric cell 19 will be darkened. The photo-electric cell 18 being illuminated will act as a relay to permit the flow of current through circuit 21 and to thus close switch 40 to energize coil 42. Thus the contacts 36 will be held in open position.

With the photo-electric cell 19 darkened by the column of water in the gauge glass, no current will pass through the amplifying circuit 26 so that switch 45 will be open and coil 47 will be de-energized. Thus with the photo-electric cell 19 darkened the springs 48 will hold the contacts 37 in open position. Thus as long as the level of the water remains intermediate the photo-electric cells 18 and 19, electric current will not be supplied to the motor 33 and the block 17 will remain stationary.

If, however, the level of the water rises in the boiler drum, the water column will also rise in the gauge glass thus darkening the photo-electric cell 18. This will cause this photo-electric cell to cease functioning as a relay with the result that circuit 21 will be de-energized and contact 40 will be moved to open position by spring 41. This will effect a de-energization of coil 42 and springs 43 will then close contacts 36 to close the circuit through the motor 33 to rotate the shaft 30 in a direction to move the block 17 upwardly. The motor will continue to rotate until the photo-electric cell 18 is again raised above the level of the water column in the gauge glass and becomes illuminated, at which time the circuit will again be established through circuit 21 and contacts 36 will be opened.

If, instead of rising, the level of the water in the boiler should drop, photo-electric cell 19 would be illuminated with the result that circuit 26 would be energized. This would effect an energization of the coil 47 to close the contacts 37. Closing of the contacts 37 would supply electrical current to the motor 33 to rotate the shaft 30 in the opposite direction until the photo-electric cell 19 was again brought below the level of the water in the gauge glass and thus shielded from the light reflected by the reflector 15. Thus it will be seen that the water column in the gauge glass constitutes a shield between the light reflected by the reflector 15 and the photo-electric cells. Thus, as the water level rises or falls, the photo-electric cells will be energized or de-energized to effect a movement of the block 17 until the photo-electric cells are again in their normal positions; that is, one above and the other below the level of the water.

This movement of the block 17 is utilized for controlling the illumination of a series of lamp bulbs. Thus, as illustrated in Figure 1 of the drawings, there is provided a cabinet 50 and mounted in this cabinet are a series of lamp bulbs 51 corresponding to different water levels. One contact of each lamp is electrically connected by a conductor 52 to a source of electrical current, while the other conductor of each lamp is positioned to be engaged by a contact 53 which is fixed to the block for vertical movement therewith. The contact member 53 is electrically connected to the source of electrical energy by conductor 54 so that as the block 17 moves upwardly, the lamp bulbs 51 will be successively illuminated to indicate the level of the water in the boiler drum.

From the above it will be apparent that the invention as thus far described provides a member mounted for vertical movement to correspond to the level of the water in the boiler drum. Vertical movement of this member is controlled by means of photo-electric cells carried by this member. These photo-electric cells are energized or de-energized, dependent upon the level of the water in the boiler, and control suitable electric circuits which effect a movement of the vertically movable member. The arrangement also includes a vertical series of lamps and connections whereby these lamps are so illuminated that the height of the series illuminated corresponds to the level of the water in the boiler drum.

Figure 2:
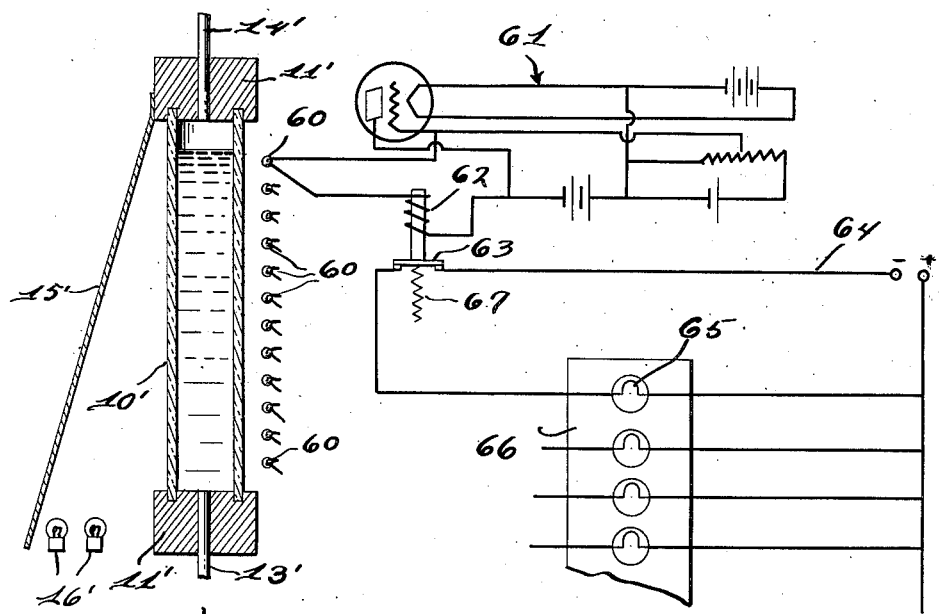
Figure 2 is a view similar to Figure 1 showing a slightly modified form of mechanism.

In Figure 2 a slightly modified form of construction is shown in which there is substituted for the pair of movable photo-electric cells above described a series of photo-electric cells, one cell corresponding to each unit of the height of the water in the boiler drum or gauge. Referring then more particularly to this figure of the drawings, it will be noted that there is provided a gauge glass 10′ mounted in fittings 11′ and connected to the steam and water pipes 14′ and 13′ respectively. Associated with this gauge glass is a reflector 15′ against which light is directed by suitable lamp bulbs or the like 16′.

Associated with the gauge glass 10′ and arranged adjacent the side thereof opposite the shield 15′ is a series of photo-electric cells 60. These cells are vertically arranged in spaced relation to each other, each cell corresponding to one increment of the level of the water in the gauge glass or boiler drum.

Each cell 60 is electrically connected to an amplifying circuit 61 and each amplifying circuit includes a coil 62 for actuating a contact 63. Each contact 63 controls the flow of electric current through a circuit 64 and each circuit 64 includes a lamp bulb or the like 65. The lamp bulbs 65 are vertically arranged in a casing 66 in the same manner as are the lamp bulbs 51, with the result that as the circuits 61 are successively energized or de-energized, in dependence upon the level of the water in the boiler drum, the flow of electrical current to the lamp bulbs 65 will be controlled.

It is preferable, when utilizing a series of photo-electric cells in the manner above described, to associate a spring 67 with each contact 63, these springs tending to hold the contacts closed. Thus the series of lamp bulbs illuminated will correspond to the level of the water in the boiler drum while the series of lamp bulbs which are not illuminated will correspond to the steam space in the boiler drum.

The operation of this form of invention is as follows. As the column of water rises in the gauge glass in dependence upon the rising of the level of the water in the boiler drum, the photoelectric cells 60 will be successively darkened, starting from the lower end of the series. The corresponding circuits 61 will be successively de-energized with the result that the coils 62 of these circuits will be de-energized and the springs 67 will close the contacts 63 of the corresponding circuits 64. Thus, as the water level rises the lamp bulbs 65 will be successively illuminated, starting from the bottom of the series.

The invention further contemplates associating with the circuits of the lamp bulbs 51 or 65, suitable alarms to indicate predetermined high and low water levels and a suitable mechanism for controlling the flow of water to the boiler drum. To accomplish this the structure diagrammatically shown in Figure 3 of the drawings may be provided and it is to be understood that this structure may be associated with the form of invention shown in either Figure 1 or 2 above described.

Figure 3:
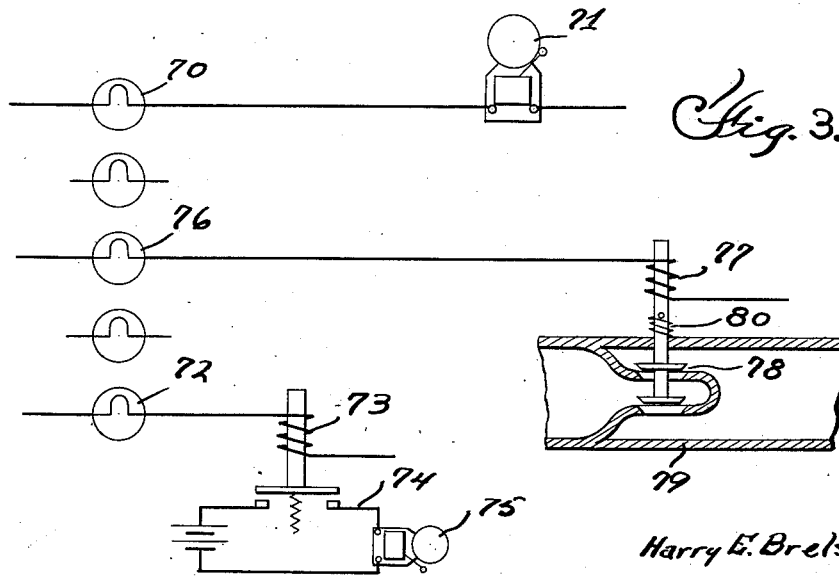
Figure 3 is a semi-diagrammatic view showing the wiring connections for operating a supply valve and high and low level alarms.

Referring then to Figure 3 of the drawings, there is associated with one of the lamp bulbs 70 which corresponds to a predetermined high water level, an alarm 71. The arrangement is such that whenever the bulb 70 is illuminated thus indicating that the level of the water has reached this predetermined high point, electric current will be supplied to the alarm 71 to actuate the latter.

A second lamp bulb 72 corresponding to a predetermined low water level may be selected and associated with this lamp bulb and electrically connected thereto, is a relay 73 for controlling the flow of electric current through an auxiliary circuit 74. The arrangement is such that whenever the lamp bulb 72 is illuminated the circuit 74 is de-energized, while if the flow of electric current through the lamp bulb 72 is cut off, a spring associated with the relay 73 closes the circuit 74 to actuate a suitable alarm 75 mounted in this circuit. Thus, whenever the level of the water falls below the selected low point with the result that the lamp bulb 72 becomes darkened, the circuit 74 is closed and the alarm 75 is actuated.

To automatically control the supply of water to the boiler drum, any one of the lamp bulbs may be selected to actuate a suitable valve in the supply line to the boiler drum. Thus, a lamp bulb designated by the reference character 76 may be selected, and electrically connected to the lamp bulb is a relay 77 for controlling a valve 78 mounted in the supply pipe 79. The arrangement is such that when the lamp bulb 76 is not illuminated, a spring 80 moves the valve 78 to open position to permit the flow of water to the boiler drum. This flow continues until the level of the water rises sufficiently to effect a closing of the electrical circuit through the lamp bulb 76, at which time the relay 77 functions to close the valve 78. It will be understood that the lamp bulbs 70, 72, and 76 may be arbitrarily selected from the series of lamp bulbs 51 or 65 to actuate the alarms and the feed water control valve at any predetermined desired points.

From the above it will be apparent that the invention provides a means for indicating and controlling the level of a liquid and that this means includes an element sensitive to light and a shield movable in dependence upon the level of the liquid being controlled, which shield is positioned between a source of light and the light sensitive element. In the first described embodiment of the invention it is to be understood that the mechanism shown for raising and lowering the photo-electric cells might be replaced by any other suitable mechanism such as solenoids or the like, and that the invention is not to be construed as limited to the details of construction disclosed. The inventive principles may be incorporated in a number of different devices and the right is therefore reserved to make all such changes in the details of construction and arrangement of parts as will fall within the purview of the attached claims.

What I claim as my invention is:

1. In a device of the character described, a liquid container, a pair of light sensitive cells, means for directing light rays toward said cells, a transparent liquid container in the path of said light rays, the liquid in said second mentioned container acting as a shield for certain of the light rays and the second mentioned container being so connected to the first mentioned container that the level of the liquid in the second mentioned container varies in dependence upon variations in the level of the liquid in the first mentioned container, means operable to move said cells, said means acting to maintain said cells in such a position that one of the cells is exposed to the light rays from said source while the other of said cells is shielded from the light rays by the liquid in said container, and indicating means controlled by the movement of said cells.

2. In a device of the character described, a liquid container, a pair of light sensitive cells, means for directing light rays toward said cells, a transparent liquid container in the path of said light rays, the liquid in said second mentioned container acting as a shield for certain of the light rays and the second mentioned container being so connected to the first mentioned container that the level of the liquid in the second mentioned container varies in dependence upon variations in the level of the liquid in the first mentioned container, an electric system responsive to variations in the relative illumination of said cells, means controlled by said electric system for moving said cells, and indicating means controlled by the movement of said cells.

3. In a device of the character described, a liquid container, a pair of light sensitive cells, means for directing light rays toward said cells, a transparent liquid container in the path of said light rays, the liquid in said second mentioned container acting as a shield for certain of the light rays and the second mentioned container being so connected to the first mentioned container that the level of the liquid in the second mentioned container varies in dependence upon variations in the level of the liquid in the first mentioned container, means responsive to variations in the relative illumination of said cells operable to move said cells, said means acting to maintain said cells in such a position that one of the cells is exposed to the light rays from said source while the other of said cells is shielded from the light rays by the liquid in said container, and indicating means controlled by the movement of said cells.

4. In a device of the character described, a liquid container, a pair of light sensitive cells mounted for vertical movement, a source of light for directing light rays toward the path of movement of said cells, a gauge glass disposed between said source of light and the path of movement of said cells, the liquid in said gauge glass acting as a shield for certain of the light rays from said source and said gauge glass being so connected to the liquid container that the level of the liquid in the gauge glass varies in dependence upon variations in the level of the liquid in the container, means operable upon variations of the level of the liquid in said gauge glass to vertically move said cells to maintain one of said cells exposed to the light rays from said source and the other of said cells shielded from the light rays by the liquid in said container, and indicating means controlled by the movement of said cells.

5. In a device of the character described, a liquid container, a vertically disposed transparent gauge glass so connected to the liquid container that the level of the liquid in the gauge glass varies in dependence upon variations in the level of the liquid in the container, a source of light disposed on one side of said gauge glass for directing rays of light through the gauge glass, a pair of photoelectric cells mounted for vertical movement adjacent the side of said gauge glass opposite the side at which the source of light is located, the liquid in said gauge glass acting as a shield between the source of light and the photoelectric cells, a motor for effecting vertical movement of said cells, an electrical system connected to said cells and responsive to variations in the relative illumination of said cells caused by changes in the level of the liquid in the gauge glass, said electric system being connected to said motor and controlling the latter to cause the motor to so move the photoelectric cells as to maintain one of said cells in position to be illuminated by the light rays passing through said gauge glass and the other of said cells to be shielded from the light rays by the liquid in the gauge glass, and indicating means controlled by the movement of said light cells.

6. In a device of the character described, a light sensitive means, a source of light arranged to direct rays of light toward said light sensitive means, a transparent liquid container so disposed between the source of light and light sensitive means that the liquid in said container may act as a shield between the source of light and the light sensitive means, the normal position of the light sensitive means with reference to the level of the liquid in the container being such that the illumination of the light sensitive means varies upon changes in the level of the liquid in the container, means for moving the light sensitive means relative to the container, means controlled by the light sensitive means and dependent upon the illumination thereof for so actuating the moving means as to maintain the light sensitive means in its normal position with reference to the level of the liquid in the container, and indicating means controlled by the movement of the said light sensitive means.

7. In a device of the character described, a pair of light sensitive elements, a source of light arranged to direct rays of light toward said light sensitive elements, a transparent liquid container so disposed between the source of light and the light sensitive elements that the liquid in said container may act as a shield between the source of light and the light sensitive elements, the normal position of the light sensitive elements with reference to the level of the liquid in the container being such that one of the light sensitive elements is normally light and the other is normally dark, means for moving said light sensitive elements as a unit, means controlled by the light sensitive elements and dependent upon the illumination thereof for so actuating the said moving means that the said light sensitive elements will be maintained in their normal position with reference to the level of the liquid in the container, and indicating means controlled by the movement of said light sensitive elements.

8. In a device of the character described, a pair of photoelectric cells disposed one above the other, a source of light arranged to direct rays of light toward said photoelectric cells, a transparent liquid container so disposed between the source of light and the photoelectric cells that the liquid in said container may act as a shield between the source of light and the photoelectric cells, the normal position of the photoelectric cells being such that the upper cell is above the level of the liquid in the container and is therefore relatively light while the lower cell is below the level of the liquid in the container and is therefore relatively dark, means for moving said photoelectric cells as a unit vertically relative to the container, means operating when the upper photoelectric cell becomes darkened incident to a rise in the level of the liquid in the container to so actuate the moving means as to cause the same to move the photoelectric cells upwardly to a position where the upper cell is above the level of the liquid in the container, means operating when the lower cell becomes illuminated incident to a fall in the level of the liquid in the container to so actuate said moving means that the photoelectric cells will move downwardly sufficiently to move the lower photoelectric cell below the level of the liquid in the container, and indicating means controlled by the movement of said photoelectric cells.

HARRY E. BRELSFORD.